United States Patent [19]

Maeda et al.

[11] 4,205,260

[45] May 27, 1980

[54] MOTOR CONTROL SYSTEM

[75] Inventors: Toshinobu Maeda, Kawanishi; Yoshikazu Nakamura, Yamatokoriyama; Akio Kawazoe, Kanagawa, all of Japan

[73] Assignees: Matsushita Electric Industrial Co., Ltd., Osaka; Oki Electric Industry Co., Ltd., Tokyo, both of Japan

[21] Appl. No.: 919,973

[22] Filed: Jun. 28, 1978

[30] Foreign Application Priority Data

Jun. 30, 1977 [JP] Japan ............................ 52/78756
Jun. 30, 1977 [JP] Japan ............................ 52/78757

[51] Int. Cl.² ................................................ H02P 5/16
[52] U.S. Cl. ..................................... 318/318; 318/327; 328/41
[58] Field of Search ............... 318/314, 318, 326, 329, 318/327, 341, 490; 324/166; 307/233 A, 225 R; 328/41; 361/51

[56] References Cited

U.S. PATENT DOCUMENTS

| 3,646,417 | 2/1972 | Cassie et al. | 318/318 |
| 3,843,914 | 10/1974 | Carlson et al. | 318/327 |
| 3,863,151 | 1/1975 | Hahlganss | 318/318 |
| 3,950,682 | 4/1976 | Dohanich, Jr. | 318/318 |
| 4,027,217 | 5/1977 | Harman | 318/318 |

OTHER PUBLICATIONS

CMOS Cookbook, Don Lancaster, 1977, Howard W. Sams and Co., Inc., pp. 282-285.

*Primary Examiner*—B. Dobeck
*Attorney, Agent, or Firm*—Burgess, Ryan and Wayne

[57] ABSTRACT

In a motor control system including a clock pulse generator, use is made of the clock pulses for deriving digitally, the speed-above-normal signal, the starting signal, the brake-release signal and the normal or forward rotation signal for displaying the normal or forward rotation. In response to the starting signal, 100% torque control voltage is generated and in case of the forced reversal in rotation, 100% torque control voltage for preventing the rotation in the reverse direction is generated.

5 Claims, 11 Drawing Figures (A) INPUT R OF COUNTER 29
(B) INPUT C OF COUNTER 29
(C) OUTPUT $O_1$ OF COUNTER 29
(D) OUTPUT $O_2$ OF COUNTER 29
(E) OUTPUT $O_3$ OF COUNTER 29
(F) OUTPUT $O_4$ OF COUNTER 29
(G) OUTPUT $O_5$ OF COUNTER 29
(H) OUTPUT $O_6$ OF COUNTER 29
(I) OUTPUT $O_7$ OF COUNTER 29
(J) OUTPUT $O_8$ OF COUNTER 29
(K) OUTPUT OF GATE 34
(L) OUTPUT OF GATE 35
(M) INPUT D OF FLIP-FLOP 40
(N) OUTPUT Q OF FLIP-FLOP 40

(A) OUTPUT 1
(B) OUTPUT 8
(C) OUTPUT 51
(D) OUTPUT 52
(E) 53 O1
(F) 53 O2
(G) 53 O3
(H) OUTPUT 59
(I) OUTPUT 56
(J) OUTPUT 57

MOTOR CONTROL SYSTEM

BACKGROUND OF THE INVENTION

The present invention relates to an improved DC motor control system.

In order to control or more particularly, to speed regulate the small-sized DC motors and especially those used in the audio equipment such as the record players, tape recorders and so on, a quartz resonator is generally used to generate the clock pulses which are compared with the pulses proportional to the rotational speed of a rotating body such as a turntable driven by a DC motor under control to detect the phase difference between them, whereby the rotation of the rotating body may be synchronized with the clock pulses.

In order to obtain the speed-above-normal signal, the starting signal, the brake-release signal and the normal or forward rotation signal used for displaying the normal or forward rotation in the DC motor control system of the type described above, use is made of a frequency generator for generating pulses whose frequency is proportional to the rotational speed of a rotating body driven by the DC motor and a frequency-voltage converter for converting the output pulses from the frequency generator into the DC signal the level of which is compared in an analog manner as disclosed in Japanese Laid-Open Patent application No. 52-1481. However, the motor control system or the motor speed regulation device of the type described cannot attain satisfactory results because of the production variation of parts characteristics and of the difficulty in attainment of compensation for temperature and voltage variations.

SUMMARY OF THE PRESENT INVENTION

One of the objects of the present invention is therefore to provide a motor control system capable of accomplishing the starting, speed regulation, stopping, braking, brake release and display or indication of a motor speed with a higher degree of accuracy.

A motor control system in accordance with the present invention comprises a synchronization circuit having a frequency generator for generating pulses the frequency of which is in proportion to the rotational speed of a motor under control, and a clock pulse generator for generating clock pulses the frequency of which is substantially higher than that of the pulses from said frequency generator, whereby the pulses from said frequency generator are synchronized with the reference or clock pulses so as to generate a synchronizing or sync pulse with a predetermined pulse width; a frequency divider; and a counter with a reset means, whereby the sync pulse from said synchronization circuit is applied to the reset terminal of said counter; and the clock pulses are frequency divided by said frequency divider with a division factor of N and the output from said frequency divider is applied to said counter so that the motor speed display signal as well as the motor speed regulation signal may be derived from the output from said counter.

BRIEF DESCRIPTION OF THE DRAWINGS

Same reference numerals are used to designate similar parts throughout the figures.

DESCRIPTION OF THE PREFERRED EMBODIMENT

Figure 1:
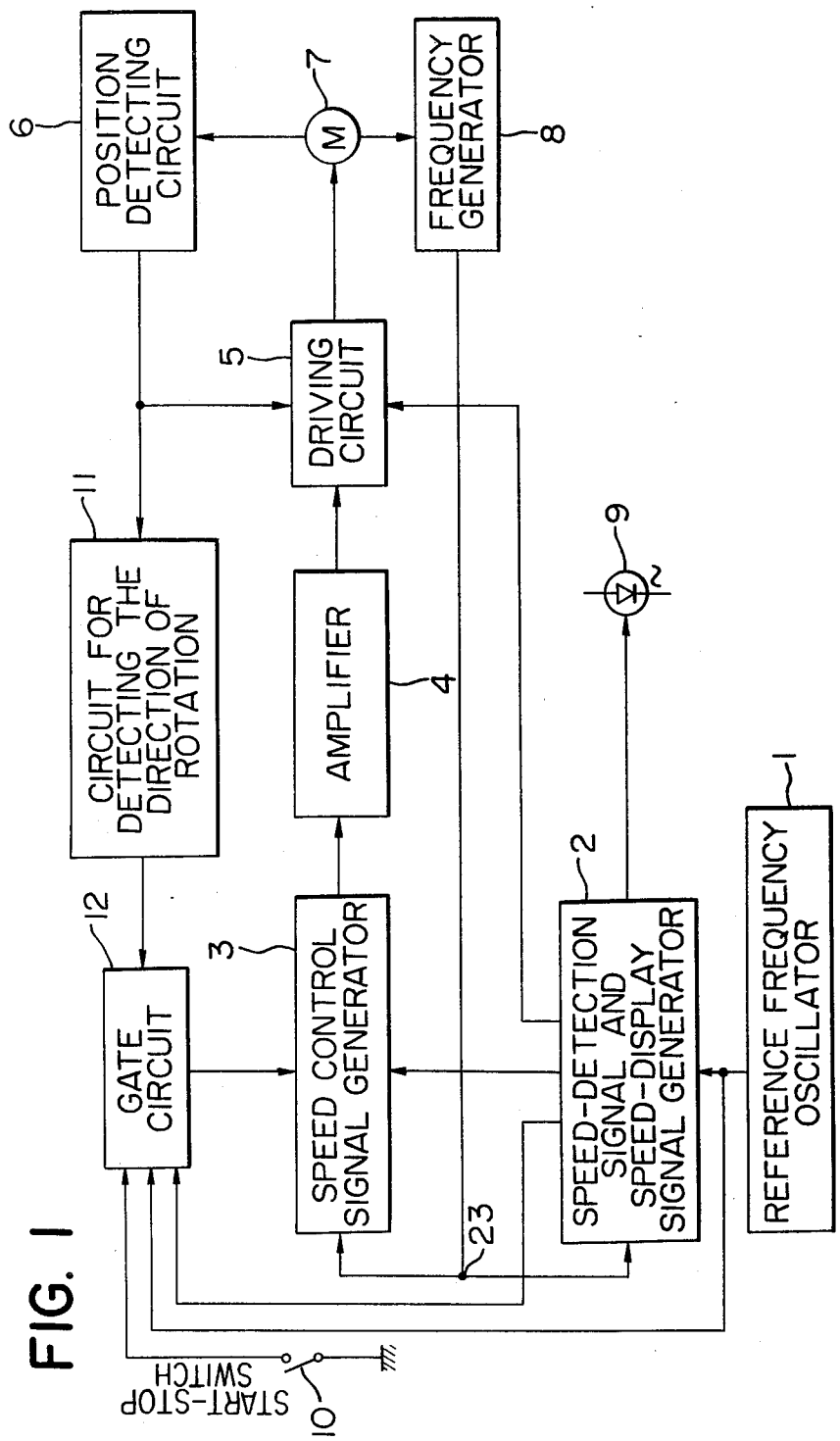
FIG. 1 is a block diagram of a motor control system in accordance with the present invention.

FIG. 1 shows a block diagram of a motor-speed-regulating device in accordance with the present invention. Reference numeral 1 designates a clock pulse generator or a reference frequency oscillator; 2, a speed-detection signal and speed-display signal generator; 3, a speed control signal generator; 4, an amplifier for comparing an input signal with a reference voltage and amplifying the input signal; 5, a driving circuit; 6, a position detecting circuit; 7, a DC motor; 8, a frequency generator; 9, a speed display or indicator; 10, a start-stop switch; 11, a circuit for detecting the direction of rotation; and 12, a gate circuit.

When the start-stop switch 10 is closed, the speed control signal generator 3 generates a maximum voltage which is compared with a reference voltage and amplified by the amplifier 4 and then is applied to the driving circuit 5. The driving circuit 5 passes the current only through a winding out of a plurality windings of the motor 7 which is selected by the position detecting circuit 6, thereby generating the driving torque. When the motor 7 is rotated, the frequency generator 8 generates pulses in proportion to the rotational speed of the motor 7, and the pulses are applied to the speed control signal generator 3. The speed control signal generator 3 converts the input pulses into a direct current voltage or potential whose level is in proportion to the rotational speed of the motor 7. The output DC voltage is applied to the amplifier 4 which in turn compares the input with a predetermined DC potential and generates an error voltage which is applied to the driving circuit 5.

The motor speed is increased until a voltage set by a closed loop consisting of the speed control signal generator 3, the amplifier 4, the driving circuit 5, the DC motor 7, the frequency generator 8 coincides with a DC potential or voltage generated in response to the pulses representative of the rotational speed of the motor 7. When the two DC voltages coincide with each other, the motor speed is maintained constant.

Based on the input pulses from the reference frequency oscillator 1 and the frequency generator 8, the speed detection signal and speed display signal generator 2 detects whether or not the motor speed coincides with a predetermined speed. In case of the coincidence, the signal generator 2 transmits a display signal to the speed indicator 9, but when the motor speed exceeds a reference speed; that is, in case of a speed above normal, it transmits a speed-above-normal signal to the speed regulation signal generator 3, the driving circuit 5 and the gate circuit 12.

In response to the speed-above-normal signal from the signal generator 2, the driving circuit 5 switches to a position detection signal so that the motor 7 may generate the deceleration torque, and the speed control signal generator 3 generates the deceleration torque.

When the motor 7 is completely stationary, no signal is transmitted from the frequency generator 8 even when the start-stop switch 10 is closed. Therefore, when the speed control signal generator 3 is generating the speed control signal based on the sample-and-hold system, no error voltage is generated because there exists no sample pulse. In this case, the speed detection signal and speed display signal generator 2 generates pulses which actuate the gate circuit 12 so as to cause the speed regulation signal generator 3 to generate a starting voltage.

When the start-stop switch 10 is opened, a stop signal causes the driving circuit 5 through the speed detection signal and speed display signal generator 2 to switch to the direction in which the deceleration torque is generated. Simultaneously, the gate circuit 12 is actuated through the speed control signal generator 3 so that the deceleration control voltage may be generated. In this case, the deceleration torque must be removed immediately before the motor 7, which has been retarded or braked, is brought to complete rest. Therefore, in response to the decrease in number of pulses from the frequency generator 8, the speed detection signal and speed display signal generator 2 applies the brake-release signal to the speed control signal generator 3 through the gate circuit 12 and to the driving circuit 5, thereby stopping the motor 7 immediately.

Figure 2:
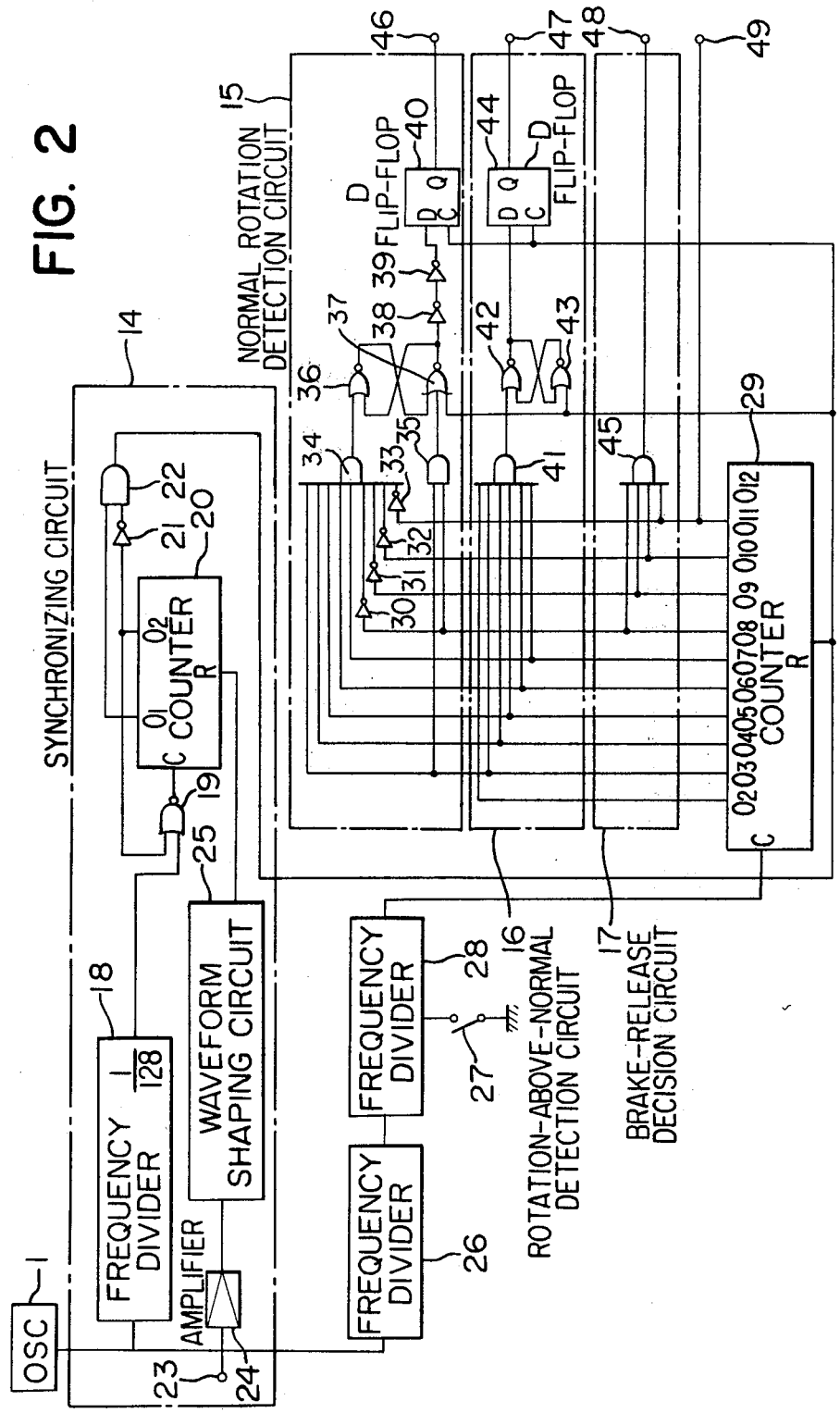
FIG. 2 shows the circuit diagram of a speed detection signal and speed display signal generator.

Next referring to FIG. 2, the speed detection signal and speed display signal generator 2 will be described in detail. In FIG. 2, reference numeral 14 denotes a synchronizing circuit for synchronizing or sync the pulse signal from the frequency generator 8 with the reference signal from the reference frequency oscillator 1; 15, a normal rotation detection circuit for impressing the output signal from the sync circuit 14 and the output signal from the reference frequency oscillator 1 on the clock and reset terminals, respectively, of a counter 29, thereby displaying the normal rotation of a rotating body; 16, a rotation-above-normal detection circuit; and 17, a brake-release decision circuit.

Figure 3:
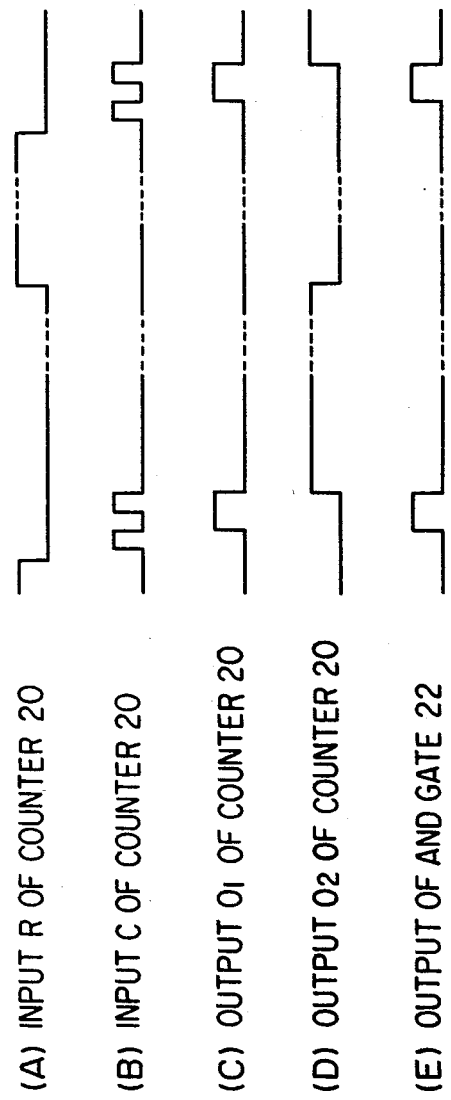
FIGS. 3-7 show waveforms used for the explanation of the mode of operation of the signal generator shown in FIG. 2.

First, the sync circuit 14 will be described with further reference to FIG. 3. The pulses from the frequency generator 8 are applied to a terminal 23, amplified by an amplifier 24, shaped by a waveform shaping circuit 25 and applied to the reset terminal of a counter 20 as shown at (A) in FIG. 3. The signal from the reference frequency oscillator 1 is frequency-divided by a frequency divider 18 and applied to one of two input terminals of a NOR gate 20. The output from the NOR gate 20 is applied to the terminal c of the counter 20 as shown at (B) in FIG. 3. The output $O_1$ from the counter 20 [See FIG. 3(C)] is applied to one of the two input terminals of an AND gate 22 while the output $O_2$ [See FIG. 3(D)] is applied through an inverter 21 to the other input terminal of the gate 22. The output from the AND gate 22 is shown at (E) in FIG. 3 and the pulse width is equal to the clock frequency. The output $O_2$ is also applied to the other input terminal of the NOR gate 19 so that the counter 20 counts only two clocks and remains disabled until it receives the next reset pulse.

In this case, jitter of one clock cycle at the maximum occurs, but when the reference frequency is selected sufficiently higher than the frequency of the output signal from the frequency generator 8, the adverse effects due to jitter may be made negligible relative to the output signal from the frequency generator 8.

The sync pulses which are derived by synchronizing the output pulses from the frequency generator 8 with the divided frequency of the output signal from the reference frequency oscillator 1 is in synchronism with the motor speed as well as the frequency of the output signal from the oscillator 1. Assume that in case of the normal rotation of the motor the frequency of the output signal from the frequency generator be 100 Hz and the clock frequency 100 KHz, then the sync pulse has the period of 10 ms and the pulse width of 10 $\mu$sec. The maximum jitter is 10 $\mu$sec.

The output signal from the reference frequency oscillator 1 is applied through two frequency dividers 26 and 28 to the clock terminal c of the counter 29 while the output signal from the sync circuit 14 is applied to the reset terminal R. With a selection switch 27, the frequency division of 1/27 or 1/20 by the frequency divider 28 may be selected in order to select, for instance, the speed of 33⅓ or 45 rpm of a record player.

Figure 4:
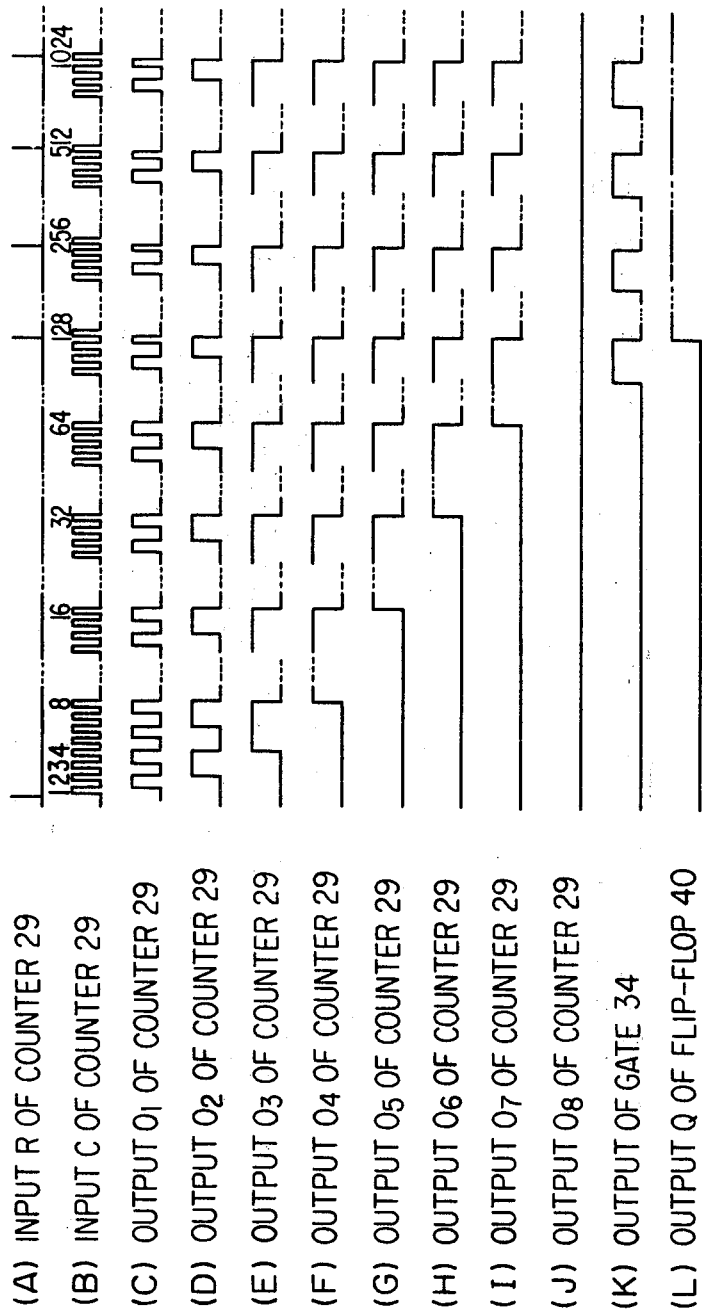
Figure 7:
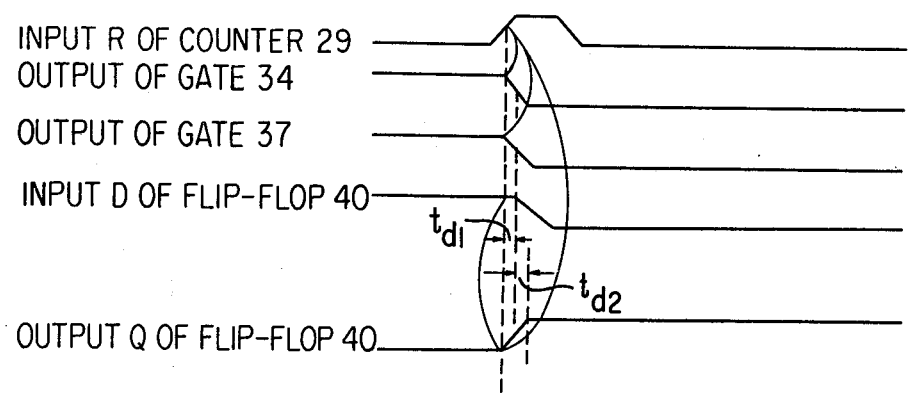

Next with further reference of FIG. 4, the normal rotation detection circuit 15 will be described. Assume that the sync pulse with the frequency of 100 Hz and the pulse width of 10 $\mu$sec be applied to the reset terminal R of the counter 29 and that the frequency of the output signal from the frequency divider 26 is 345.6 KHz and the frequency division by the frequency divider 28 is 1/27, then the frequency of the output signal $O_7$ from the counter 29 becomes $345600/(27\times128)=100$ Hz. The output from a gate 34 is the logic product of the outputs $O_2$, $O_3$, $O_4$, $O_5$, $O_6$, $O_7$, $\overline{O_8}$, $\overline{O_9}$, $\overline{O_{10}}$ and $\overline{O_{11}}$. Therefore, the output from the gate 34 has a pulse width equal to the pulse widths of four clock pulses and its trailing or falling edge coincides with that of the output pulse $O_7$ as shown at (K) in FIG. 4. The output from the gate 34 is applied to a flip-flop consisting of two NOR gates 36 and 37 and the output from this flip-flop is applied through two gates 38 and 39 to the D input terminal of a D flip-flop 40 which is a memory means. The input to the clock terminal C of the D flip-flop 40 appears at the leading edge of the reset pulse applied to the counter 29. Thus the output Q from the D flip-flop 40 becomes "H". In this case, the reset pulse is also applied to the reset terminal of the flip-flop consisting of gates 36 and 37, but due to the time delays caused by the gates 37, 38 and 39 the timing at which the input to D terminal of the D flip-flop 40 falls is delayed so that the D input "H" is applied to the D flip-flop 40 (See FIG. 7).

Figure 5:
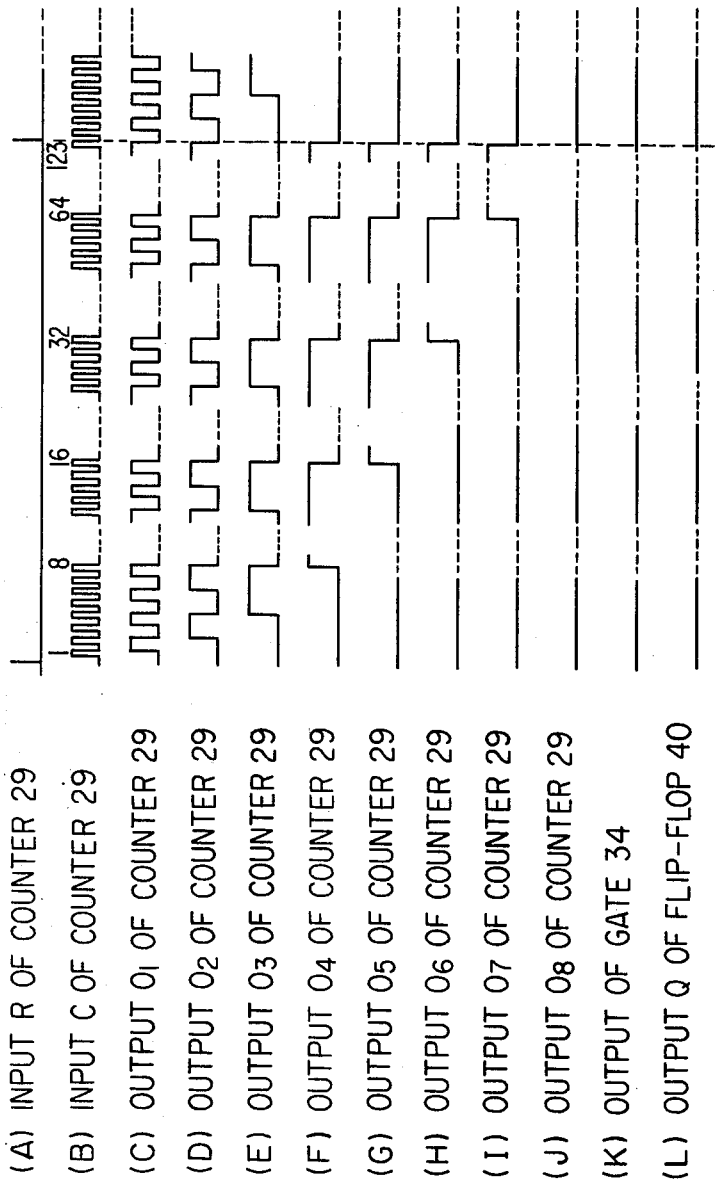

As the motor speed is increased gradually, the interval between the sync pulses applied to the R terminal of the counter 29 becomes shorter. When the clock period becomes shorter than that of the four clock pulses preceding the trailing or falling edge of the output pulse $O_7$ (See FIG. 5), no output appears from the gate 34. The output from the gate 37 therefore becomes "L". When the input to the D terminal of the D flip-flop 40 is "L", the output Q is "L".

Figure 6:
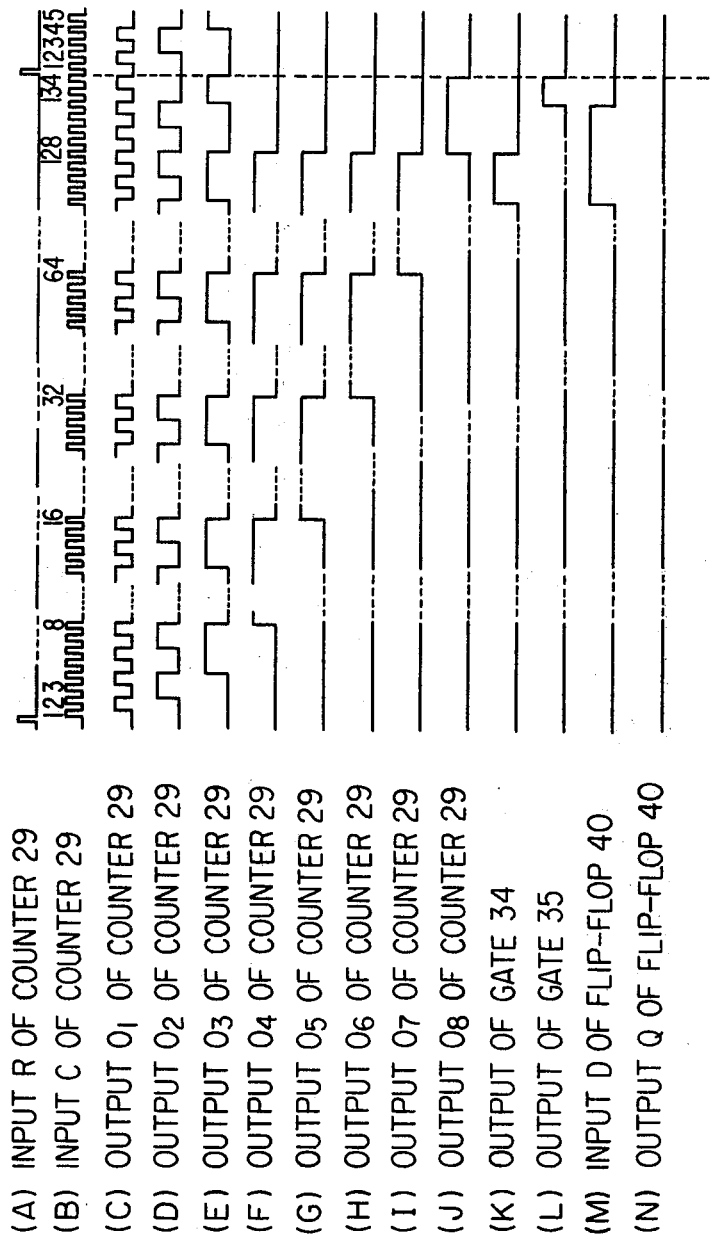

On the other hand, when the motor speed is gradually decreased, the interval between the sync pulses applied to the R terminal of the counter 29 becomes longer. Then the output $O_8$ appears and when the pulse width of the output $O_8$ becomes longer than four clock pulses (See FIG. 6), the output appears from a gate 35 so that the output from the gate 37 becomes "L". Since the D input of D flip-flop 40 is "L", the output Q is "L".

As described above, the normal rotation detection circuit 15 maintains the output 46 from D flip-flop 40 "H" when the sync pulses or the output pulses from the frequency generator 8 are within ±4/128 or ±3.125% of the frequency division. That is, the circuit 15 gives the information that the motor is rotating at a normal speed with a permissible tolerance. The output from the circuit 15 may be used for indicating the motor speed.

The motor speed deviation may be increased beyond or decreased from ±4/128 by means of additional gate circuits. So far, the frequency of the output signal from the frequency generator 8 has been described as being 100 Hz when the motor speed is 33⅓ rpm. In case of 45 rpm, however, the frequency becomes $100 \times 45/33.3333 = 135$ Hz. The frequency divider 28 is switched by means of the selection switch 27 to the 1/20 frequency division mode. The frequency of the output signal from the frequency divider 26 remains unchanged; that is, 345.6 KHz. Therefore, the reference frequency oscillator 1 may use a fixed frequency quartz resonator. In case of the motor speed at 45 rpm, the frequency of the output signal from the frequency generator 8 is 135 Hz. This means that it generates 180 pulses per rotation of a rotating body. However, it is to be understood that the present invention is not limited to this rate or 180 pulses per rotation and that the rate may be suitably selected depending upon the frequency of the pulses generated by the reference frequency oscillator 1.

Next, the rotation-above-normal detection circuit 16 will be described. It is basically similar in construction to the normal rotation detection circuit 15 described above. When the motor speed becomes faster than the output $O_7$ from the counter 29 by more than two clock pulses, the output Q at the output terminal 47 of a D flip-flop 44 becomes "H" which is used for regulating the motor speed. In this embodiment, when a rotating body rotates at a speed $2/128 = 1.562\%$ higher than a normal speed, the Q signal becomes "H". This speed-above-normal deviation limit may be varied easily by means of a combination of various gates. In FIG. 2, reference numeral 41 designates a 6-input AND gate and 42 and 43, NOR gates which constitute a RS flip-flop.

The function of the brake-release decision circuit 17 is reversal of the function of the speed-above-normal detection circuit 15. That is, the rotating body is applied with a brake until its speed drops to 1/16 of a normal speed, and when the speed drops to 1/16 of a normal speed, the circuit 17 generates a brake-release signal. Instead of the ratio of 1/16, any suitable ratio may be selected by a combination of gates so that a rotating body having a different momentum may be stopped very smoothly. Furthermore, depending upon the change in momentum and friction of a rotating body, gates may be so switched that the brake-release signal may be generated at an optimum speed.

In FIG. 2, reference numeral 45 is a four-input AND gate, and 49 is an output terminal directly connected to the $O_{11}$ terminal of the counter 29. Pulses appear at the output terminal 49 during the time when the speed of a rotating body increases from zero to 12.5% of a normal speed. These pulses may be used as a starting signal for producing the starting torque only when the start-stop switch is closed. The range may be changed to 0 to 6.25%.

As described above, according to the present invention, the motor speed or the speed of a rotating body driven by the motor may be digitally detected and compared with a reference frequency generated by a quartz resonator or the like with a higher degree of stability. Therefore, the very minute speed deviation less than a few percent or even less than one percent may be detected. The detected speed deviation may be used for displaying a motor speed and for effecting the motor controls such as the starting, speed regulating and stopping with a higher degree of accuracy.

Figure 8:
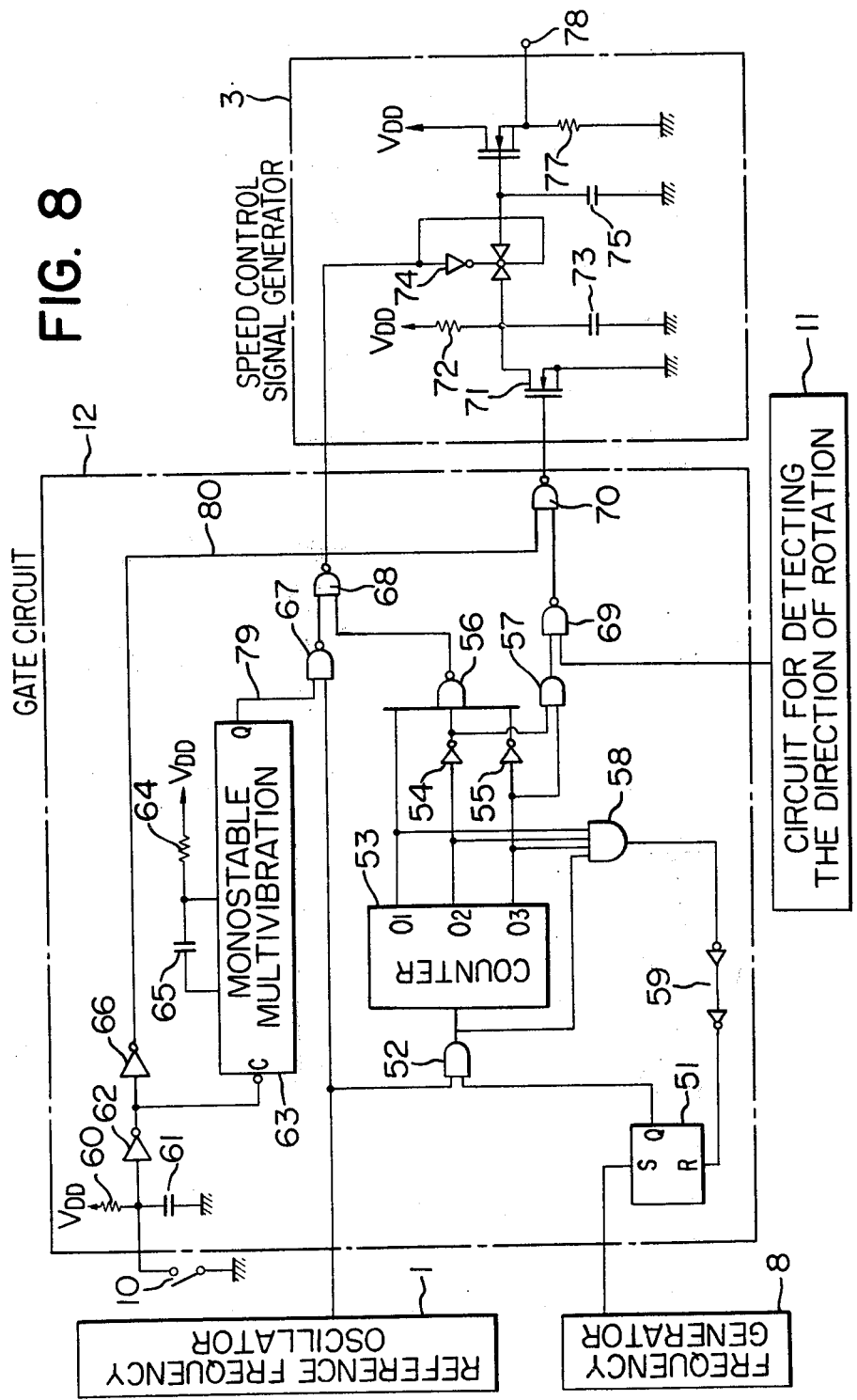
FIG. 8 is a circuit diagram of a speed control signal generator and a gate circuit shown in FIG. 1.

Referring to FIG. 8, a starting circuit, a reversal rotation preventive circuit and a stopping circuit in a sample-and-hold circuit will be described. The sample-and-hold circuit is generally used as a motor-speed-regulation signal generator. In the sample-and-hold circuit, the samples pulses and reset pulses are generated in response to the output pulses from the frequency generator 8 so that when the motor 7 is not rotating, no sample pulse is generated and consequently the speed regulation voltage is zero. Therefore, in case of a sample-and-hold circuit of the type wherein 100% torque is obtained at zero control voltage, no starting circuit is needed, but in case of a sample-and-hold circuit of the type wherein 100% torque is not available when the control voltage is equal to a line voltage, a motor cannot be started.

Therefore, the gate circuit 12 is so designed and constructed as to generate the starting sample pulses. That is, the gate circuit 12 compares the output pulses from the frequency generator 8 with the clock pulses from the reference frequency oscillator or clock pulse generator 1 and generates the starting sample pulses when a time interval, counted in terms of the number of clock pulses, during which the gate circuit 12 has received no pulse from the frequency generator 8 after the start-stop switch 10 has been closed, exceeds a predetermined time interval.

The circuit 11 for detecting the direction of rotation to be referred to as "the direction of rotation detection circuit" for brevity, responds to the output signal from the position detection circuit 6 to reverse its output depending upon the normal and reverse directions. In case of the reversal of the direction of rotation by the external force, the gate circuit 12 suppresses the reset pulse but generates the sample pulses only so that only the voltage for 100% torque in the normal direction may be normally generated so as to prevent the reversal of rotation.

Still referring to FIG. 8, the frequency of the clock pulses generated by the reference frequency oscillator or the clock pulse generator 1 is higher than the frequency of the output pulses from the frequency generator 8 as described elsewhere. The output pulse from the frequency generator 8 is shown at (b) in FIG. 9.

The output pulses from the frequency generator 8 are applied to the set terminal S of a RS flip-flop 51 whose output terminal Q is applied to one of two input terminals of an AND gate 52. The clock pulses from the oscillator 1 are applied to the other input terminal of the AND gate 52. The output from the gate 52 is applied to the input terminal of a counter 53 as well as to one of the four input terminals of an AND gate 58. The output $O_1$ from the counter 53 is directly applied to an input terminal of a three-input AND gate 56 while the outputs $O_2$ and $O_3$ are applied through inverters 54 and 55, respectively to the input terminals of the gate 56. The output $O_3$ is also applied to one of the two input terminals of an AND gate 57 and the output from the inverter 54; that is, $\overline{O_2}$ is applied to the other input terminal thereof. The three outputs $O_1$, $O_2$ and $O_3$ from the counter 53 are applied to the input terminals of the four-input AND gate 58 the output of which is applied to the reset terminal R of the flip-flop 51 through a time-delay circuit 59.

A series circuit consisting of a resistor 60 and a capacitor 61 is interconnected between a power source $V_{DD}$ and ground and the stationary contact of the start-open switch 10 is connected to the junction between the resistor 60 and the capacitor 61. The junction is connected to an inverter 62 the output of which is applied not only to an inverter 66 but also to the input terminal c of a monostable multivibrator 63. The multivibrator 63 is connected to the power source $V_{DD}$ through a capacitor 65 and a resistor 64 which determine the set state of the monostable multivibrator 63. The output Q of the multivibrator 63 is applied to one of the two input terminals of an NAND gate 67 while the clock pulses from the reference oscillator 1 is applied to the other input terminal thereof. The output from the NAND gate 67 is applied to one of the two input terminals of a NAND gate 68 and the output from the three-input NAND gate 56 is applied to the other input terminal thereof.

The output from the direction-of-rotation detection circuit 11 is connected to one of the two input terminals of an NAND gate 69 and the output from the two-input AND gate 57 is applied to the other input terminal thereof. The output from the NAND gate 69 is applied to one of the two input terminals of a NAND gate 70 and the output from the inverter 66 is applied to the other input terminal thereof.

Figure 9:
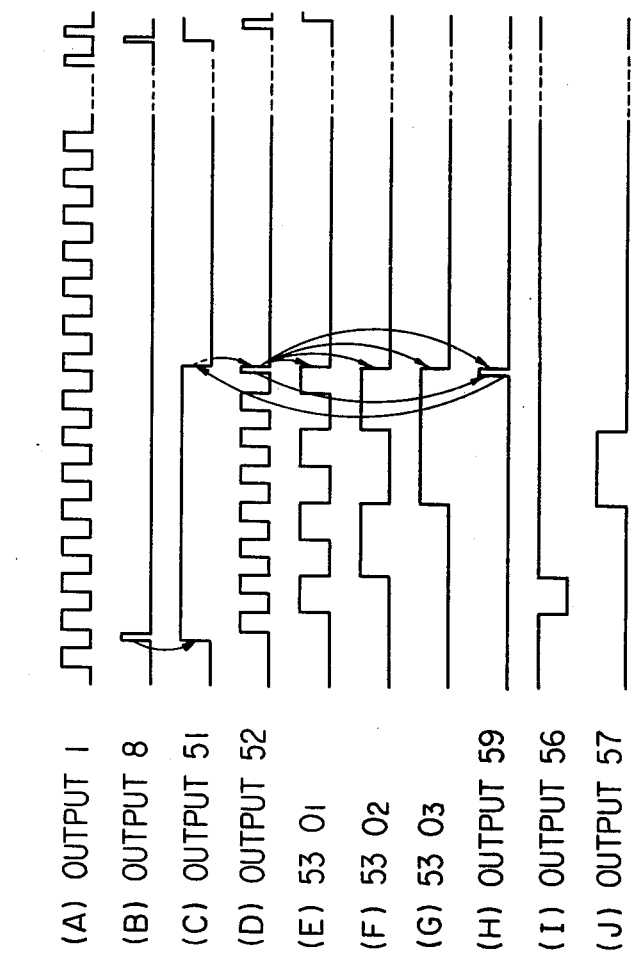
FIG. 9 shows waveforms used for the explanation of the mode of operation thereof.

The two outputs of the gate circuit 12; that is, the output from the NAND gate 68 and the output from the NAND gate 70 are applied as the sampling pulse and the reset pulse, respectively, to the speed control signal generator 3 which is a sample-and-hold circuit. That is, the output or reset pulse [See FIG. 9(j)] from the NAND gate 70 is applied to the gate of a transistor 71 so as to discharge a capacitor 73 which has been charged through a resistor 72 with the current from the power source $V_{DD}$ (positive). When the sample pulse of the inverted waveform shown at (i) in FIG. 9 is applied to a transmission gate when the reset pulse [See FIG. 9(j)] has disappeared so that the capacitor 73 is being gradually charged, the charges stored on the capacitor 73 are transferred through the transmission gate 74 to a hold capacitor 75. The voltage across the hold capacitor 75 is impressed on the gate of a transistor 76 so that an output voltage across a resistor 77 is almost equal to the voltage across the hold capacitor 75.

As described above, every time when the frequency generator 8 generates one pulse, a pair of sampling and reset pulses are generated so that a DC voltage in proportion to the frequency of the pulse generated by the frequency generator 8 may be derived. As a result, the DC voltage across the output resistor 77 which is inversely proportional to the motor speed is derived from an output terminal 78 and is used for the motor speed regulation.

Next the mode of operation will be described. In case of the normal rotation, the outputs from the gates 56 and 57 are the sampling and reset pulses, respectively, as will be described below with further reference to FIG. 9.

In response to the output pulse [FIG. 9(b)] from the frequency generator, the RS flip-flop 51 is set and in response to the output Q therefrom the two-input AND gate 52 is opened so that the counter 53 starts counting the clock pulses [FIG. 9(a)] from the oscillator 1. In response to the output $O_1$, $O_2$ and $O_3$ from the counter 53, the sampling pulse [FIG. 9(i)] appears at the output of the gate 56 and the reset pulse [FIG. 9(j)] appears at the output terminal of the gate 57. The output [FIG. 9(h)] from the time-delay circuit 59 resets the flip-flop 51 so that its output becomes "L" and consequently the gate 52 is closed. As a result, the clock pulses are not counted until the next output pulse is transmitted from the frequency generator 8. Thus, in response to one output pulse from the frequency generator 8, one pair of sampling and reset pulses appears.

In case of the starting, the start-stop switch 10 is opened so that the capacitor 61 is charged through the resistor 60. The voltage at the junction between them becomes "H" so that the output from the inverter 62 is "L". The monostable multivibrator 63 is triggered to output the pulse "H" the width of which is dependent upon the values of the resistor 64 and the capacitor 65. The NAND gate 67 is therefore opened so that the clock pulses from the clock pulse generator 1 are passed through the gate 67 and inverted by the gate 68 as the sampling pulse to be applied to the sample-and-hold circuit.

In case of the starting, no output is derived from the frequency generator 8 so that no pulse is derived from the gate 56, but the output pulse from the NAND gate 57 may be used as the sampling pulse for starting the motor.

In case of the normal rotation, the output from the direction-of-rotation detection circuit 11 is "H" but in case of the reverse rotation, the output is "L" and applied to the two-input NAND gate 69 so that the reset pulse [FIG. 9(j)] is suppressed. As a result the capacitor 73 is not discharged so that 100% torque control voltage may be obtained at any speed.

Next the stopping regulation will be described. When the start-stop switch 10 is closed, the capacitor 61 is discharged so that the voltage across it becomes almost zero. Therefore, the output from the inverter 66 becomes "L" and is applied to the gate 70. Therefore, the output from the gate 70 is "H" so that the transistor 71 is enabled and consequently the driving torque control voltage disappears.

Instead of the starting pulse 79 (Q output of the monostable multivibrator 63), the output signal 49 [See FIG. 2] may be used for starting the motor.

As described above, according to the motor control system in accordance with the present invention, the sampling pulse as well as the reset pulse to be applied to the speed regulation signal generator or the sample-and-hold circuit may be derived through the gate circuit so that the starting, prevention of reversal in rotation and stopping may be controlled or regulated in a stable and reliable manner. Furthermore, the control system may be easily provided in the form of an integrated circuit.

The rotating body driven by the motor may be a turntable of a record player. However, it is to be understood that the present invention is not limited to the motors used in the audio and video equipment such as a record player and that it may be equally applied to any other motors which must be controlled with a higher degree of accuracy.

Figure 11:
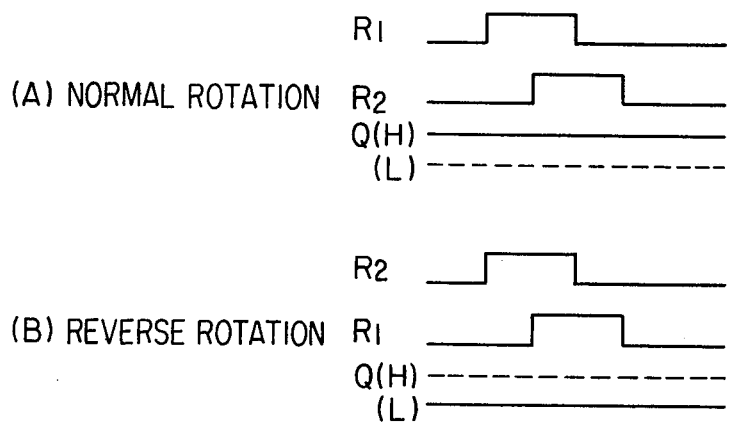
FIG. 11 shows waveforms used for the explanation of the mode of operation thereof.
Figure 10:
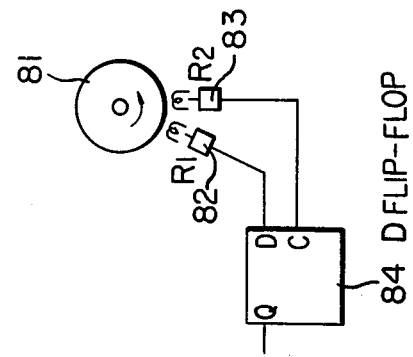
FIG. 10 is a block diagram of a circuit for detecting the direction of rotation of the motor shown in FIG. 1.

Next referring to FIGS. 10 and 11, the direction-of-rotation detection circuit 11 will be described in detail. Reference numeral 81 denotes a rotor which rotates in synchronism with the motor 7 [See FIG. 2]; and 82 and 83, conventional sensors which generate pulses $R_1$ and R2, respectively, when the rotor 81 is rotated. The pulses R1 and R2 are different in phase and are applied to the D and C input terminals of a D flip-flop 84. In case of the normal or forward direction, as shown in FIG. 11(a), the C input becomes "H" when the D input is "H" so that the output Q remains "H". In case of the reversal of rotation, as shown in FIG. 11(b), when the input D is "L", the input C becomes "H" so that the output Q remains "L". Thus, the direction-of-rotation detection circuit 11 outputs "H" in case of the normal or forward direction of rotation and "L" in case of the reverse direction.

What is claimed is:

1. A motor speed control system, comprising:
   an electric motor,
   a driving means for providing a drive signal to said motor to selectively generate acceleration and deceleration torques therein;
   a frequency generator coupled to said motor for generating speed indicating pulses having a frequency corresponding to the motor speed;
   a clock pulse generator for generating clock pulses at a fixed frequency substantially greater than the particular frequency of said speed indicating pulses corresponding to a desired speed of said motor;
   a synchronizing circuit for selectively delaying each of said speed indicating pulses to synchronize the same with said clock pulses,
   a frequency divider coupled to said clock pulse generator for providing reference pulses having said particular frequency and synchronous with said selectively delayed speed indicating pulses;
   a multistage counter having a pulse count input terminal, a reset terminal and a plurality of output terminals;
   means for applying said reference pulses to said input terminal and said selectively delayed speed indicating pulses to said reset terminal of said counter;
   decoding means coupled to the output terminals of said counter for (i) generating a motor control signal for controlling the operation of said driving means to drive said motor at said particular speed, (ii) generating a display signal for indicating when said motor is at said particular speed, and (iii) generating a warning signal when the counter output appears to correspond to a motor speed in excess of said particular speed, for starting said motor or reducing a braking torque applied thereto.

2. A motor control system as set forth in claim 1 wherein said decoding means comprises a flip-flop which is set in response to the logical product of
   (i) the logical product of the outputs from said counter each at a frequency less than 1/N of said clock frequency, and
   (ii) the logical product of the inverted output or outputs from said counter each at a frequency higher than 1/N of said clock frequency;
   said flip-flop being reset in response to the logical product of said outputs each at a frequency less than 1/N of the clock frequency and said outputs each at a frequency higher than 1/N of the clock frequency; memory means for storing the output from said flip-flop;
   further comprising a motor speed display for displaying the contents of said memory means to indicate that the motor speed is within a normal speed range.

3. A motor control system as set forth in claim 1, further comprising a sample-and-hold circuit for generating a control voltage, a circuit for detecting the angular position of said motor and a start-stop switch, the clock pulses from said clock pulse generator being applied as the sampling pulses to said sample-and-hold circuit during a predetermined time after the motor is started, whereby a starting voltage is produced.

4. A motor control system as set forth in claim 3, wherein said decoding means includes a circuit for detecting the direction of rotation of said motor, the motor output drive signal so that in case of an externally forced motor reversal, the output from said circuit for detecting the direction of rotation of the motor suppresses the reset pulse to be applied to said sample-and-hold circuit so that 100% motor torque voltage is generated at any speed.

5. A motor control system as set forth in claim 3 further characterized in that
   the hold pulse to be applied to said sample-and-reset circuit is always maintained in the active state, whereby no driving torque voltage is generated.

* * * * *